United States Patent
Lee et al.

(10) Patent No.: US 8,263,671 B2
(45) Date of Patent: Sep. 11, 2012

(54) ION EXCHANGEABLE MIXTURE AND METHOD OF PRODUCING THE SAME

(75) Inventors: Hun-joo Lee, Seoul (KR); Ji-na Namgoong, Yongin-si (KR); Soo-suk Lee, Suwon-si (KR); Joon-ho Kim, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/086,741

(22) Filed: Apr. 14, 2011

(65) Prior Publication Data

US 2011/0196050 A1  Aug. 11, 2011

Related U.S. Application Data

(62) Division of application No. 11/453,116, filed on Jun. 14, 2006, now Pat. No. 7,947,196.

(30) Foreign Application Priority Data

Jun. 18, 2005  (KR) .................. 10-2005-0052723

(51) Int. Cl.
*B01J 49/00* (2006.01)
*C08J 5/20* (2006.01)
*C01B 31/16* (2006.01)

(52) U.S. Cl. .......... 521/25; 204/520; 204/601; 252/184; 435/306.1

(58) Field of Classification Search .................. 252/184; 204/520, 601; 435/306.1; 521/25
See application file for complete search history.

(56) References Cited

U.S. PATENT DOCUMENTS

| | | | |
|---|---|---|---|
| 3,857,824 A | 12/1974 | Atkins et al. | |
| 6,019,998 A | 2/2000 | Nomoto et al. | |
| 6,814,865 B1 | 11/2004 | Aminabhavi et al. | |
| 7,214,301 B2 | 5/2007 | Thorstensen et al. | |
| 7,947,196 B2 * | 5/2011 | Lee et al. ...................... | 252/184 |
| 2001/0008929 A1 | 7/2001 | Audibert-Hayet et al. | |

FOREIGN PATENT DOCUMENTS

| JP | 5-507025 A | 10/1993 |
|---|---|---|
| JP | 07-309766 | 11/1995 |
| JP | 2003-512170 A | 4/2003 |

OTHER PUBLICATIONS

Japanese Office Action with English Translation for Application No. 2006-162727 dated Jul. 6, 2010.
Japanese Office Action dated May 19, 2009.

* cited by examiner

*Primary Examiner* — Bijan Ahvazi
(74) *Attorney, Agent, or Firm* — Cantor Colburn LLP

(57) ABSTRACT

An ion exchangeable mixture containing a polymeric compound consisting of an ion exchange resin, an acrylamide mixture containing at least one bisacrylamide and at least one acrylamide, and a copolymer obtained by reacting the polymeric compound with the acrylamide mixture, and a method of producing the same are provided. The ion exchangeable membrane produced by using the ion exchangeable mixture has significantly smaller electric resistance than conventional ion exchangeable membranes, and has excellent selective permeability because the ion exchangeable membrane is electrically charged. The ion exchangeable membrane can be produced under very mild production conditions, and thus can be produced very easily. Furthermore, the ion exchangeable membrane can be also formed into film during a crosslinking reaction in a solvent of water, and thus is advantageous in that the ion exchangeable membrane can be freely produced into desired sizes, shapes and forms.

5 Claims, 2 Drawing Sheets

ION EXCHANGEABLE MIXTURE AND METHOD OF PRODUCING THE SAME

This application is a divisional of U.S. application Ser. No. 11/453,116, filed on Jun. 14, 2006, which claims priority to Korean Patent Application No. 10-2005-0052723, filed on Jun. 18, 2005, and all the benefits accruing therefrom under 35 U.S.C. 119, the contents of which in their entirety are herein incorporated by reference.

BACKGROUND OF THE INVENTION

1. Field of the Invention

The present invention relates to an ion exchangeable mixture and a method of producing the same, and more particularly, to an ion exchangeable mixture which has low electric resistance and selective permeability, and which can be produced easily so that film formation using the ion exchangeable mixture can be carried out without any restriction in the film's size, shape or the like, and a method of producing the same.

2. Description of the Related Art

A microfluidic device refers to a device in which inlets, outlets, reactors and the like are connected through microchannels. Such a device is well known in the related art and is widely used as a microanalytic device such as a Lab-on-a-Chip (LOC). This microfluidic device generally includes, in addition to the microchannels, micropumps and micromixers for transporting and mixing of fluids, and microfilters for filtering the transported fluids.

The microfluidic device that is used as a biological analytic device, such as an LOC, should be in general accompanied by an apparatus necessary in the process of lysing cells or viruses, or should make use of externally lysed cell solutions or preliminarily purified materials. Conventionally used cytolytic methods include an alkali treatment method, an enzymatic method, a boiling method and the like.

The alkali treatment method involves cell lysis through exposure of cells or viruses to high pH by adding a chemical substance such as NaOH to them. However, there are problems when conventional methods of lysing cells or viruses such as the alkali treatment method are applied to microfluidic devices such as LOCs. For example, when an alkali solution such as a NaOH solution is to be added, or when an alkaline cytolysate resulting from cell lysis with an alkali solution is to be neutralized by adding a neutralizing solution, there are required a process for introducing a cytolytic alkali solution and a device for the introducing process, and there also occurs a problem that the sample solution would be diluted by the alkali solution and neutralizing solution added. The process of introducing these solutions and the additional device may develop into a serious problem with respect to a microfluidic device handling microscale volumes. Also, in order to be able to use biological analytic methods such as PCR in the following stages, the alkali solution such as a NaOH solution must be removed or neutralized.

In order to solve such problems as described above, a method is needed in which a solution is made alkaline by adjusting the solution pH through electrolysis, without the need to additionally introduce an alkali solution, and then cells are lysed in situ while the pH thus achieved is maintained by means of an ion exchangeable membrane. However, nothing has been reported on an ion exchangeable membrane which exhibits excellent selective permeability to maintain a once-achieved pH constant and has excellent electric conductivity, thereby enhancing the efficiency of electrolysis.

BRIEF SUMMARY OF THE INVENTION

The present invention provides an ion exchangeable mixture which has low electric resistance and selective permeability, and which can be easily formed into a membrane.

The present invention also provides a method of producing the ion exchangeable mixture.

The present invention also provides an ion exchangeable membrane produced by using the ion exchangeable mixture.

The present invention also provides a microfluidic device produced by using the ion exchangeable membrane.

According to an aspect of the present invention, there is provided an ion exchangeable mixture comprising (a) a polymeric compound consisting of an anion exchange resin; (b) an acrylamide mixture containing at least one bisacrylamide and at least one acrylamide; and (c) a copolymer obtained by reacting the polymeric compound consisting of an anion exchange resin with the acrylamide mixture.

According to another aspect of the present invention, there is provided another ion exchangeable mixture containing (a) a polymeric compound consisting of a cation exchange resin; (b) an acrylamide mixture containing at least one bisacrylamide and at least one acrylamide; and (c) a copolymer obtained by reacting the polymeric compound consisting of a cation exchange resin with the acrylamide mixture.

According to another aspect of the present invention, there is provided a method of producing an ion exchangeable mixture, comprising mixing a polymeric compound consisting of an anion exchange resin, an acrylamide mixture containing at least one bisacrylamide and at least one acrylamide, an initiator to produce a reactant mixture and a catalyst in a solvent, and allowing the reactant mixture to react.

According to another aspect of the present invention, there is provided a method of producing an ion exchangeable mixture, comprising mixing a polymeric compound consisting of a cation exchange resin, an acrylamide mixture containing at least one bisacrylamide and at least one acrylamide, an initiator to produce a reactant mixture and a catalyst in a solvent, and allowing the reactant mixture to react.

According to another aspect of the present invention, there is provided an ion exchangeable membrane comprising the ion exchangeable mixture.

According to another aspect of the present invention, there is provided a microfluidic device including an electrolytic unit for cell lysis which has an anode chamber, a cathode chamber, and a separating membrane disposed between the anode chamber and the cathode chamber, wherein the separating membrane is the ion exchangeable membrane.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
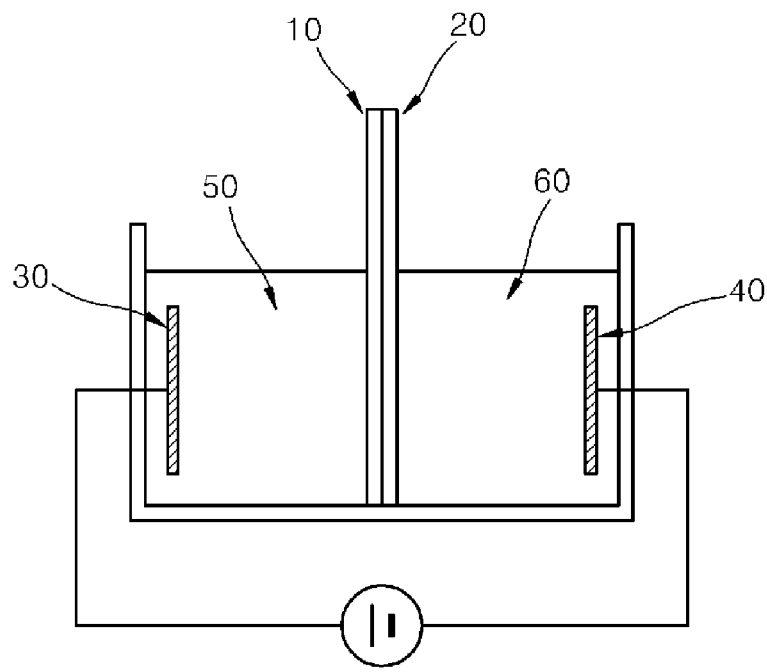
FIG. 1 is a conceptual diagram illustrating electrolysis according to an embodiment of the present invention, using the ion exchangeable membrane.

Hereinafter, the present invention will be described in more detail.

According to the first embodiment of the present invention, the invented ion exchangeable mixture contains (a) a polymeric compound consisting of an anion exchange resin; (b) an acrylamide mixture containing at least one bisacrylamide and at least one acrylamide; and (c) a copolymer obtained by reacting the polymeric compound consisting of an anion exchange resin with the acrylamide mixture.

The anion exchange resin may be a styrene-based resin, a phenolic resin, an amine-based resin or a methacrylic resin, but is not limited to these. In particular, the anion exchange resin may be a styrene-based resin substituted with trimethylamine represented by the following Formula 1:

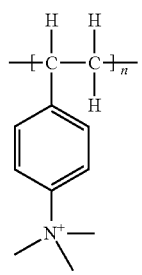

[Formula 1]

wherein n is an integer from 2 to 100,000.

The compound of Formula 1 can be prepared by polymerizing the monomer represented by the following Formula 5:

[Formula 5]

The compound of Formula 1 may be produced by polymerizing the monomer of Formula 5 through a solution polymerization method in a solvent, in the presence of an initiator such as, for example, ammonium persulfate, benzoyl peroxide (BPO) or azobisisobutyronitrile (AIBN), and a catalyst of TEMED (N,N,N',N'-tetramethylethylenediamine). The reaction may be performed at a temperature of 70° C. to 90° C. for 30 minutes to 4 hours.

The solvent is advantageously a hydrophilic solvent which does not participate in the polymerization reaction, and the solvent may be water, particularly, deionized water, or an alcohol such as methanol, ethanol, propanol or butanol, but is not limited to these.

The acrylamide mixture contains at least one bisacrylamide and at least one acrylamide. In particular, the bisacrylamide may be N,N'-methylenebisacrylamide, but is not limited to this.

The number of carbon atoms in the acrylamide may be from 2 to 10, preferably 2 to 4. Also the number of carbon atoms in the bisacrylamide may be from 3 to 15, preferably 3 to 10.

The copolymer is a product resulting from a reaction between the polymeric compound consisting of an anion exchange resin and the acrylamide mixture. A copolymer according to an embodiment of the present invention which can be prepared when the anion exchange resin is a styrene-based resin substituted with trimethylamine, may be represented by the following Formula 3:

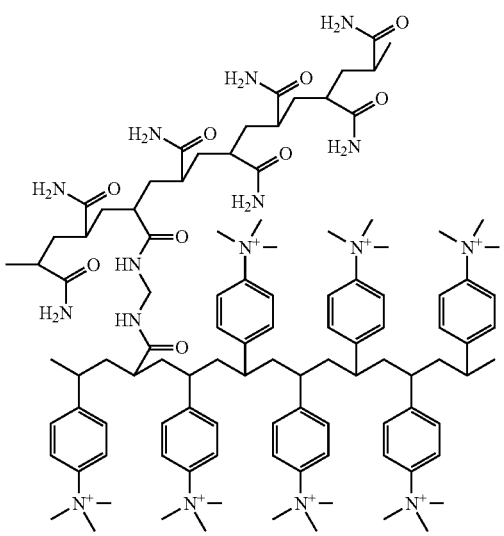

[Formula 3]

As can be seen from Formula 3, the copolymer has the chains of the anion exchange resin and polyacrylamide that are crosslinked by bisacrylamide.

The anion exchange resin, the acrylamide mixture and the copolymer are interpenetrated each other. The term interpenetration as used herein implies that the polymer chain of the anion exchange resin and the polymer chain of the acrylamide are in a three-dimensionally and randomly entangled state, the state being macroscopically homogeneous and does not involve any concentration gradient of a specific component or the like.

According to the second embodiment of the present invention, the invented ion exchangeable mixture contains (a) a polymeric compound consisting of a cation exchange resin; (b) an acrylamide mixture containing at least one bisacrylamide and at least one acrylamide; and (c) a copolymer obtained by reacting the polymeric compound consisting of a cation exchange resin with the acrylamide mixture.

The cation exchange resin may be a styrene-based resin, a phenolic resin, an amine-based resin or a methacrylic resin, but is not limited to these. In particular, the cation exchange resin may be a styrene-based resin substituted with a sulfone group represented by the following Formula 2:

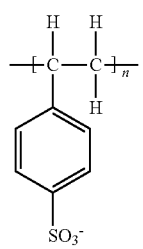

[Formula 2]

wherein n is an integer from 2 to 100,000.

The compound of Formula 2 can be prepared by polymerizing a monomer represented by the following Formula 6:

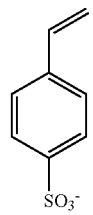

[Formula 6]

However, when the sulfone group present on the monomer is —$SO_3H$, protons may be generated during the reaction and result in an undesirable effect on the pH control of the solution. In this case, a sulfone group which is in the form of a salt with sodium or the like, for example, —$SO_3Na$, may be used.

The compound of Formula 2 may be produced by polymerizing the monomer of Formula 6 through a solution polymerization method in a solvent, in the presence of an initiator such as, for example, ammonium persulfate, BPO or AIBN, and a catalyst of TEMED. The reaction solvent and the reaction conditions are the same as those employed in the preparation of the compound of Formula 1.

The acrylamide mixture contains at least one bisacrylamide and at least one acrylamide, and as described above, the bisacrylamide may be N,N'-methylenebisacrylamide but is not limited to this.

The number of carbon atoms in the acrylamide may be from 2 to 10, preferably 2 to 4. Also, the number of carbon atoms in the bisacrylamide may be from 3 to 15, preferably 3 to 10.

The copolymer is a copolymer obtained by reacting the polymeric compound consisting of a cation exchange resin with the acrylamide mixture. The copolymer according to an embodiment of the present invention which can be prepared when the cation exchange resin is a styrene-based resin substituted with a sulfone group, may be represented by the following Formula 4:

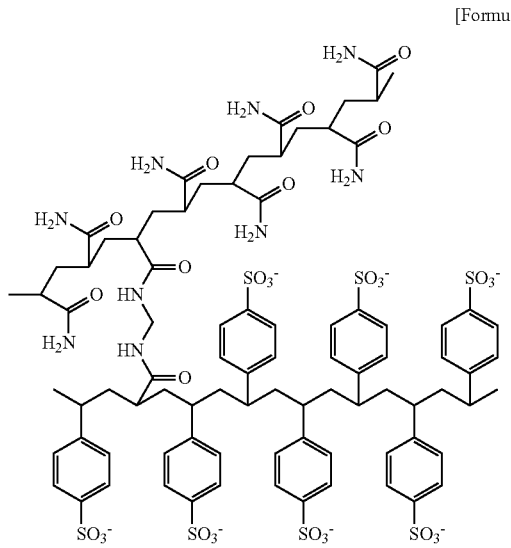

[Formula 4]

As can be seen from Formula 4, the copolymer has the chains of the cation exchange resin and polyacrylamide that are crosslinked by bisacrylamide.

The cation exchange resin, the acrylamide mixture and the copolymer are interpenetrated each other.

According to the third embodiment of the present invention, there is provided a method of producing an ion exchangeable mixture, comprising mixing a polymeric compound consisting of an anion exchange resin, an acrylamide mixture containing at least one bisacrylamide and at least one acrylamide, an initiator, and a catalyst in a solvent, and allowing the reactant mixture to react.

The reaction mixture may contain 0.1 to 20 parts by weight of the polymeric compound consisting of an anion exchange resin; 0.1 to 5 parts by weight of bisacrylamide; 5 to 40 parts by weight of acrylamide; 0.05 to 1 part by weight of the initiator; 0.05 to 1 part by weight of the catalyst; and 55 to 90 parts by weight of the solvent, based on 100 parts by weight of the whole reaction mixture.

When the amount of the polymeric compound consisting of an anion exchange resin is less than 0.1 parts by weight, the amount of charge is small, and when the amount of the polymeric compound consisting of an anion exchange resin is more than 20 parts by weight, the strength of the produced ion exchangeable mixture is weak. On the other hand, when the amount of bisacrylamide is less than 0.1 parts by weight, the strength is decreased, while when the amount of bisacrylamide is more than 5 parts by weight, the amount of water contained is reduced, thus the electric resistance being disadvantageously increased. When the amount of acrylamide is less than 5 parts by weight, the strength is decreased, and when the amount of acrylamide is more than 40 parts by weight, the amount of water contained is reduced, thus the electric resistance being disadvantageously increased. When the amount of the initiator is less than 0.05 parts by weight, the rate of reaction becomes so slow that it is not desirable, while when the amount of the initiator is more than 1 part by weight, the properties may be deteriorated. When the amount of the catalyst is less than 0.05 parts by weight, the rate of reaction becomes so slow that it is not desirable, while when the amount of the catalyst is more than 1 part by weight, the catalyst attains basicity per se and may have a side effect of making the sample into a basic solution. When the amount of the solvent is less than 55 parts by weight, the electric resistance of the produced ion exchangeable mixture increases, and when the amount of the solvent is more than 90 parts by weight, the strength is decreased.

The reaction can be carried out at room temperature, and the reaction time is adjustable in accordance with the amounts of the initiator and the catalyst. The reaction time may be in the range of 30 seconds to 20 minutes. When the reaction time is shorter than 30 seconds, the reaction may not be sufficient so that crosslinking is not well achieved. When the reaction time is longer than 20 minutes, the reaction has been completed, and thus no more reaction is required.

The initiator may be any initiator that is used in the radical polymerization reaction. The initiator is not particularly limited, but may be ammonium persulfate, BPO or AIBN. The catalyst may be TEMED.

The solvent may be water, particularly deionized water, or an alcohol such as methanol, ethanol, propanol or butanol. In particular, the solvent may be, for example, deionized water.

When the reaction is completed, an anion exchangeable mixture in a solid form is produced, and this anion exchangeable mixture contains a large quantity of water.

According to the fourth embodiment of the present invention, there is provided a method of producing an ion exchangeable mixture comprising mixing a polymeric compound consisting of a cation exchange resin, an acrylamide mixture containing at least one bisacrylamide and at least one acrylamide, an initiator, and a catalyst with a solvent, and reacting the resultant mixture.

The reaction mixture may contain 0.1 to 20 parts by weight of the polymeric compound consisting of a cation exchange resin; 0.1 to 5 parts by weight of bisacrylamide; 5 to 40 parts by weight of acrylamide; 0.05 to 1 part by weight of the initiator; 0.05 to 1 part by weight of the catalyst; and 55 to 90 parts by weight of the solvent, based on 100 parts by weight of the whole reaction mixture.

When the amount of the polymeric compound consisting of a cation exchange resin is less than 0.1 parts by weight, the amount of charge is decreased, and when the amount of the polymeric compound consisting of a cation exchange resin is more than 20 parts by weight, the strength of the produced ion exchangeable mixture is weak. The numerical limits set for the amounts of the other components have been determined for the same reasons given in the case of the anion exchangeable mixture described above. In addition, the reaction conditions, initiator, catalyst and solvent have been determined for the same reasons given above.

When the reaction is completed, a cation exchangeable mixture in a solid form is produced, and this cation exchangeable mixture contains a large quantity of water.

According to the fifth embodiment of the present invention, there is provided an ion exchangeable membrane formed from the ion exchangeable mixture. The ion exchangeable membrane has selective permeability as conventional ion exchange membranes do; thus, a cation exchangeable membrane produced from a polymeric compound consisting of a cation exchange resin allows cations, but not anions, to permeate, whereas an anion exchangeable membrane produced from a polymeric compound consisting of an anion exchange resin allows anions, but not cations, to permeate.

Accordingly, when a chamber containing a sample is separated at the center using the ion exchangeable membrane as described above, and the sample is subjected to electrolysis, the movement of the ions resulting from the electrolysis can be controlled. Consequently, the concentration of a specific ion can be selectively increased, and pH of the sample also can be adjusted.

According to an embodiment of the present invention, the ion exchangeable mixture prepared from the anion exchange resin can be used to produce an ion exchangeable membrane, and according to another embodiment of the present invention, an ion exchangeable mixture produced from the cation exchange resin can be used to produce an ion exchangeable membrane. According to yet another embodiment, an ion exchangeable mixture produced from the anion exchange resin and an ion exchangeable mixture produced from the cation exchange resin can be used to produce respective ion exchangeable membranes, and then an ion exchangeable membrane having multiple layers can be produced from these ion exchangeable membranes by laminating the ion exchangeable membranes.

In particular, an ion exchangeable membrane having multiple layers that is produced as described above can be utilized in various applications, since movements of both cations and anions can be controlled. Referring to FIG. 1, an anion exchangeable membrane 10 and a cation exchangeable membrane 20 are laminated, and the resulting laminate is used to separate a chamber into two compartments such as a cathode chamber 50 and an anode chamber 60. When a direct current is applied to the chambers, cations are generated in the cathode chamber 50, and anions are generated in the anode chamber 60. However, the cations generated in the cathode chamber 50 are restricted from moving to the anode chamber 60 because of the anion exchangeable membrane 10, while anions generated in the anode chamber 60 are restricted from moving to the cathode chamber 50 because of the cation exchangeable membrane 20. As a result, the cathode chamber 50 contains a high concentration of cations, and the anode chamber contains a high concentration of anions.

The method of forming film using the ion exchangeable mixture is not particularly limited. For example, reactants needed to prepare the ion exchangeable mixture are thinly coated on a thin film and reacted thereon, and after completion of the reaction, the film is removed, thus the ion exchangeable membrane of the present invention being obtained.

In particular, the ion exchangeable mixture employs water as the solvent and has a property capable of easily solidifying at room temperature, and thus the ion exchangeable mixture can be conveniently formed into film. Therefore, the ion exchangeable mixture can be formed into other arbitrary forms in addition to the film form.

According to the sixth embodiment of the present invention, there is provided a microfluidic device including an electrolytic unit for cell lysis which has an anode chamber, a cathode chamber and a separating membrane disposed between the anode chamber and the cathode chamber, wherein the separating membrane is the ion exchangeable membrane according to an embodiment of the present invention.

Figure 2A:
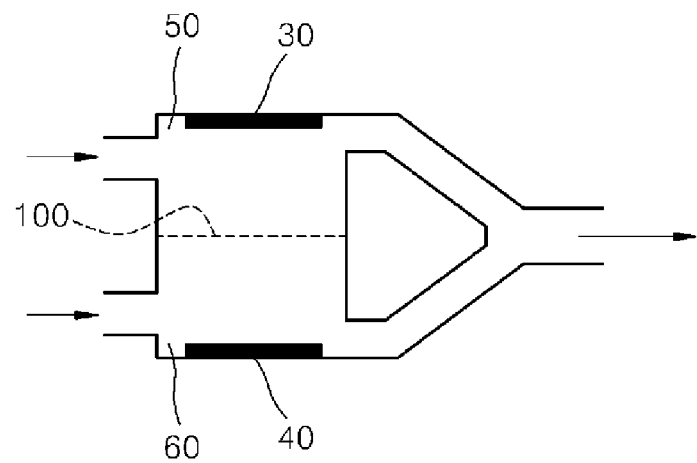
FIG. 2A through FIG. 2C are conceptual diagrams illustrating microfluidic devices including the ion exchangeable membranes according to embodiments of the present invention.

FIG. 2A is a conceptual diagram illustrating a microfluidic device including the ion exchangeable membrane 100 according to an embodiment of the present invention. The cathode chamber 50 and the anode chamber 60 are separated by the ion exchangeable membrane 100 according to an embodiment of the present invention, and the cathode chamber 50 and the anode chamber 60 are respectively provided with electrodes 30 and 40. When voltage is applied through these electrodes 30 and 40, an electrolytic reaction occurs at the cathode chamber 50 and the anode chamber 60, respectively. The cathode chamber 50 and the anode chamber 60 are respectively provided with an inlet and an outlet, and the outlets may be joined so that the electrolytic solutions from the cathode 30 and the anode 40 are mixed.

Figure 2B:
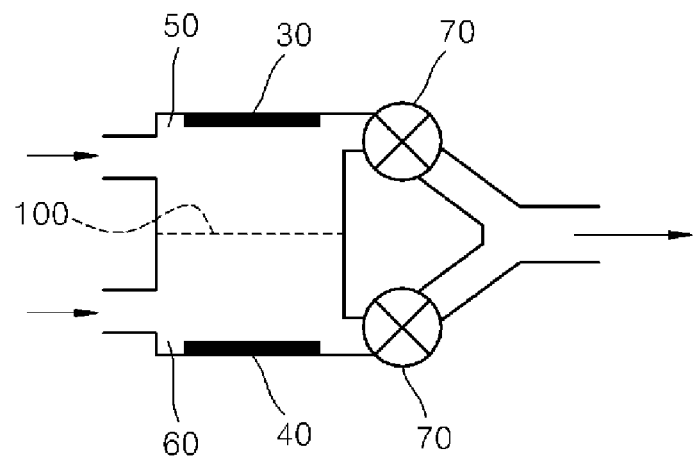
Figure 2C:
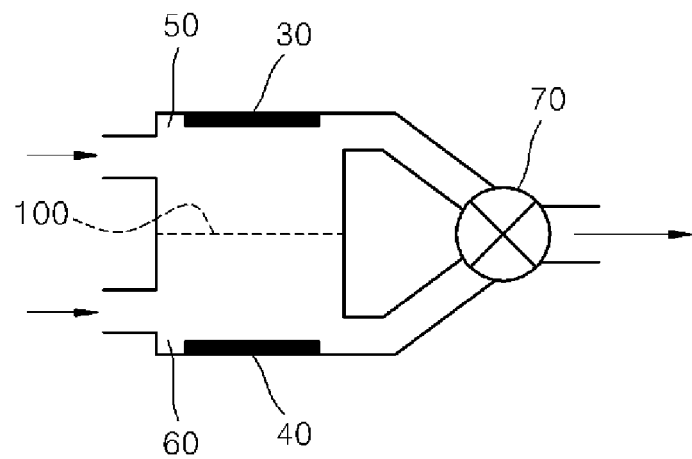

FIG. 2B and FIG. 2C are conceptual diagrams respectively illustrating a microfluidic device including the ion exchangeable membrane 100 according to an embodiment of the present invention. The microfluidic devices shown in FIG. 2B and FIG. 2C are microfluidic devices of FIG. 2A further provided with two micropumps 70 and one micropump 70, respectively. A microfluidic device having one micropump 70 as illustrated in FIG. 2C is aimed at receiving in and mixing the same amounts of the electrolytic solutions from the cathode chamber 50 and the anode chamber 60, and therefore the microfluidic device may be applicable only to the case where the equivalent of the anions generated in the anode chamber 60 by the electrolysis and the equivalent of the cations generated in the cathode chamber 50 by the electrolysis are in the same range.

Hereinafter, the constitution and effect of the present invention will be described in more detail with reference to specific Examples and Comparative Examples. However, these Examples are intended only to make the present invention more clearly comprehended, and not to limit the scope of the present invention.

EXAMPLE 1

1 g of a styrene-based ion exchange resin substituted with trimethylamine, 3.5 g of acrylamide ($CH_2CHCONH_2$), 0.5 g of bisacrylamide ($CH_2(CH_2CHCONH)_2$), 0.1 g of ammonium per sulfate, 0.1 g of TEMED, and 6 g of water were placed in a mold having a width of 15 mm, a length of 15 mm, and a thickness of 0.75 mm, and the mixture was subjected to a crosslinking reaction for 20 minutes. The resulting reaction product solidified, and the product was removed from the mold and washed, thus a solid anion exchangeable membrane being obtained. The thickness of the obtained anion exchangeable membrane was 0.75 mm.

EXAMPLE 2

A crosslinking reaction was carried out in the same manner as in Example 1, except that a styrene-based ion exchange resin substituted with a sodium salt of a sulfone group ($—SO_3^-Na^+$) was used instead of the trimethylamine-substituted styrene-based ion exchange resin. As a result, a solid cation exchangeable membrane was obtained. The thickness of the obtained cation exchangeable membrane was 0.75 mm.

EXAMPLE 3

The anion exchangeable membrane produced in Example 1 was fixed at the center of a chamber, and an aqueous solution of $Na_2SO_4$ (initial pH=5.82) at a concentration of 100 mM was introduced to both compartments of the chamber separated by the anion exchangeable membrane. A direct current (10 V) was applied to the chamber to carry out electrolysis. After applying the direct current for 1 minute, the current supply was stopped, and the change of pH was measured at an interval of 2 minutes. The results are presented in Table 1 below.

EXAMPLE 4

An electrolysis was carried out in the same manner as in Example 3, except that the cation exchangeable membrane produced in Example 2 was used instead of the anion exchangeable membrane, and the change of pH was measured. The results are presented in Table 1 below.

EXAMPLE 5

An electrolysis was carried out in the same manner as in Example 3, except that a membrane obtained by laminating and adhering the anion exchangeable membrane produced in Example 1 and the cation exchangeable membrane produced in Example 2, and the change of pH was measured. The thickness of the laminated membrane was 1.5 mm. The results of measuring the change of pH are presented in Table 1 below.

COMPARATIVE EXAMPLE 1

An acrylamide membrane was produced by the same method as the method of Example 1, except that no ion exchange resin was added. Then, an electrolysis was carried out in the same manner as in Example 3, and the change of pH was measured. The results are presented in Table 1 below.

TABLE 1

| | | Time (min) | | | | | |
|---|---|---|---|---|---|---|---|
| | | 0 | 2 | 4 | 6 | 8 | 10 |
| Example 3 | Cathode | 11.13 | 11.07 | 11.03 | 10.92 | 10.87 | 10.82 |
| | Anode | 2.63 | 2.70 | 2.74 | 2.81 | 2.85 | 2.88 |
| Example 4 | Cathode | 10.83 | 10.72 | 10.66 | 10.58 | 10.53 | 10.44 |
| | Anode | 2.92 | 2.94 | 2.97 | 3.01 | 3.05 | 3.07 |
| Example 5 | Cathode | 10.87 | 10.84 | 10.77 | 10.77 | 10.76 | 10.73 |
| | Anode | 2.66 | 2.68 | 2.73 | 2.76 | 2.83 | 2.86 |
| Comp. Ex. 1 | Cathode | 10.75 | 10.65 | 10.60 | 10.57 | 10.55 | 10.55 |
| | Anode | 2.51 | 3.21 | 3.41 | 3.8 | 4.21 | 4.35 |

As shown in Table 1, the ion exchangeable membranes of the present invention used in Example 3 through Example 5 showed pH changes of less than 0.3 for a period of 10 minutes. Thus, it can be seen that the ion exchangeable membranes all show excellent performance in restricting the movement of the ions generated as a result of the electrolysis. However, the pH change for a period of 10 minutes at the anode in Comparative Example 1 was 1.84, the value implying that the selective permeability is insufficient.

COMPARATIVE EXAMPLE 2

Electric resistance was measured using a Nafion membrane (DuPont Corp.), which is a commercially available ionomer membrane. The electric resistance was measured under a direct current having a voltage of 5 V. The results are presented by Table 2 below.

The electric resistance was measured for the membranes of Examples 3 through 5 in the same manner as in Comparative Example 2. The results are presented in Table 2 below.

TABLE 2

| | Resistance ($\Omega$) |
|---|---|
| Comparative Example 2 | 118-150 |
| Example 3 | 51-66 |
| Example 4 | 51-92 |
| Example 5 | 56-92 |

It can be seen from Table 2 that the ion exchangeable membranes of the present invention have significantly lower electric resistance than the conventional Nafion membrane. Therefore, electrolysis can be carried out more effectively when the ion exchangeable membranes of the present invention are used, compared with the case where a conventional Nafion membrane is used.

The ion exchangeable membrane produced by using the ion exchangeable mixture of the present invention has significantly lower electric resistance than conventional ion exchangeable membranes, and has excellent selective permeability because the ion exchangeable membrane is electrically charged. The ion exchangeable membrane of the present invention can be produced under very mild production conditions and thus can be produced very easily. Furthermore, the ion exchangeable membrane of the invention can be formed into film during a crosslinking reaction in a solvent of water, and thus is advantageous in that the ion exchangeable membrane can be freely produced into desired sizes, shapes and forms.

While the present invention has been particularly described with reference to exemplary embodiments thereof as shown above, it will be understood by those of ordinary skill in the art that various changes in form and details may be made therein without departing from the spirit and scope of the present invention as defined by the following claims. Therefore, any future modifications of the exemplary embodiments of the present invention would not depart from the technical scope of the present invention.

What is claimed is:

1. An ion exchangeable mixture prepared from a reaction mixture containing
    (a) 0.1 to 20 parts by weight of a polymeric compound consisting of an anion exchange resin;
    (b) an acrylamide mixture containing 5 to 40 parts by weight of at least one acrylamide and 0.1 to 5 parts by weight of at least one bisacrylamide,
    wherein the amounts of polymeric compound, acrylamide, and bisacrylamide are based on 100 parts by weight of a reaction mixture containing the polymeric compound, acrylamide, bisacrylamide, an initiator, a catalyst, and a solvent; and
    (c) a copolymer obtained by reacting the polymeric compound consisting of an anion exchange resin with the acrylamide mixture.

2. The ion exchangeable mixture of claim 1, wherein the anion exchange resin is a styrene-based resin, a phenolic resin, an amine-based resin or a methacrylic resin.

3. The ion exchangeable mixture of claim 1, wherein the anion exchange resin is a styrene-based resin substituted with trimethylamine.

4. The ion exchangeable mixture of claim 1, wherein the bisacrylamide is N,N'-methylenebisacrylamide.

5. The ion exchangeable mixture of claim 1, wherein the compounds (a) through (c) interpenetrate each other.

* * * * *